United States Patent [19]

Smithers

[11] 3,843,994
[45] Oct. 29, 1974

[54] WINDSCREEN WIPERS

[75] Inventor: Philip G. K. Smithers, Hounslow, England

[73] Assignee: Trico Products Corporation, Buffalo, N.Y.

[22] Filed: Feb. 6, 1973

[21] Appl. No.: 330,040

[30] Foreign Application Priority Data

Feb. 9, 1972   Great Britain...................... 6093/72

[52] U.S. Cl. .......................................... 15/250.32
[51] Int. Cl. ............................................. B60s 1/40
[58] Field of Search....... 15/250.32, 250.31, 250.34, 15/250.35, 250.42

[56] References Cited
UNITED STATES PATENTS

| | | | |
|---|---|---|---|
| 2,432,692 | 12/1947 | Smulski............................ | 15/250.32 |
| 2,694,827 | 11/1954 | Bacher............................. | 15/250.32 |
| 3,054,128 | 9/1962 | Prohaska et al. ................ | 15/250.32 |
| 3,085,277 | 4/1963 | Bock et al........................ | 15/250.32 |

FOREIGN PATENTS OR APPLICATIONS 893,229    4/1962   Great Britain.................. 15/250.32

*Primary Examiner*—Peter Feldman
*Attorney, Agent, or Firm*—E. Herbert Liss

[57]  ABSTRACT

A connector for securing a wiper blade to a wiper arm comprises a pair of parallel side walls secured together in spaced apart relationship with a cylindrical surface extending between the side walls. A bridge which extends between the side walls is spaced from the cylindrical surface a distance substantially equal to the thickness of the material of the wiper arm extension; the connector is pivotally mounted on the blade superstructure, either centrally thereof or to one side. A downwardly or reversely bent end portion of the arm engages the cylindrical surface at the inner surface of the end portion. In its operative position the arm is restrained against longitudinal movement between the cylindrical surface and the bridge. A releasable detent is provided on the connector to restrain the arm against angular movement relative to the connector when the arm is coupled to the blade.

9 Claims, 7 Drawing Figures

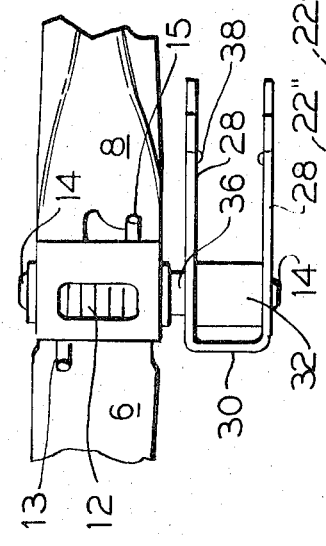
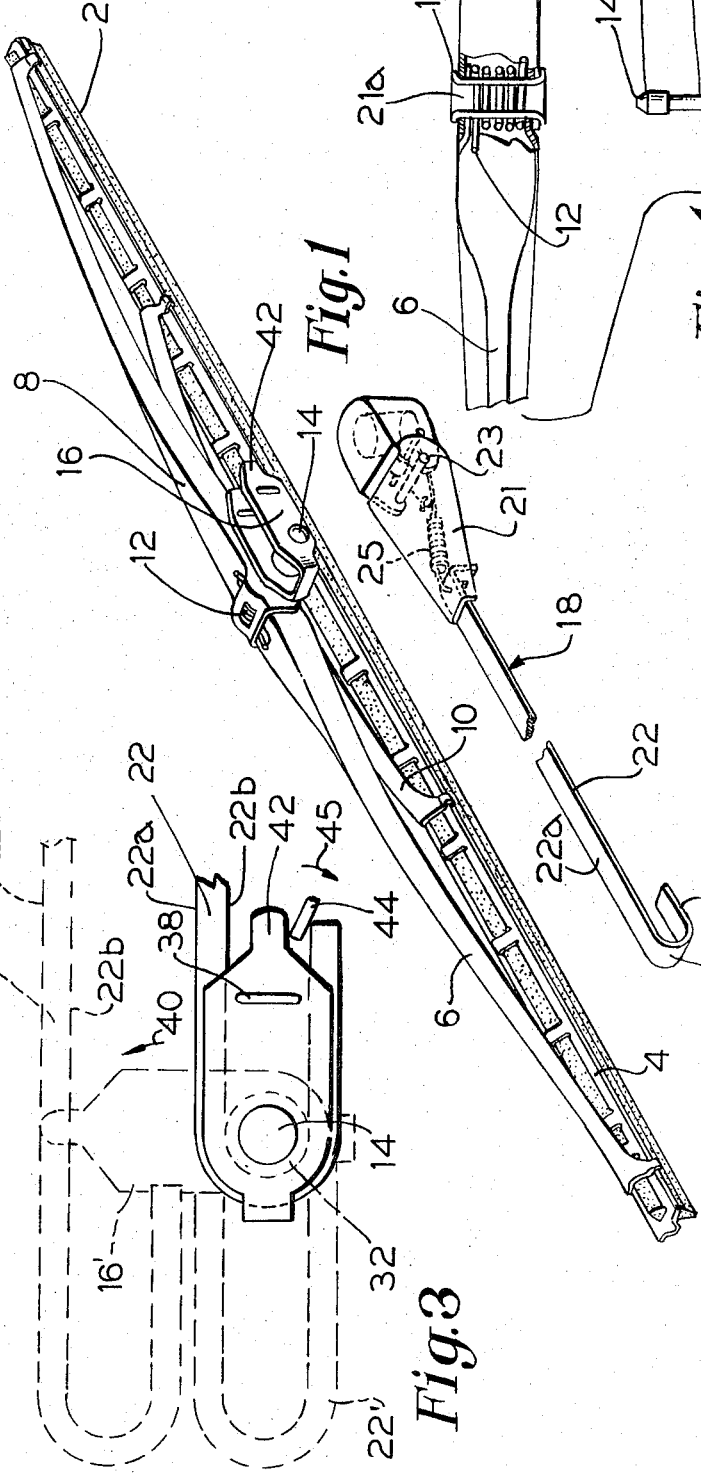
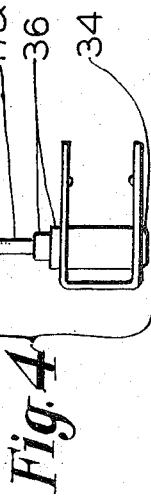

WINDSCREEN WIPERS

BACKGROUND OF THE INVENTION

The invention relates to improvements in wiper arm to blade connectors and more particularly to a pivotal connector for an arm having a downwardly or reversely bent end portion.

Connectors of this type are known as illustrated by U.S. Pat. No. 2,694,827 issued Nov. 23, 1954, U.S. Pat. No. 3,054,128 issued Sept. 18, 1962, and British Pat. No. 893,229 published Apr. 4, 1962.

It is desirable that an arm to blade connection of this type be one where the blade is positively retained in coupled position on the arm and does not rely upon the bias of the blade against the windshield to retain it in place. British Pat. No. 893,229 can be inadvertently displaced if the blade is lifted off the windshield because it requires the pressure of the blade against the windshield to retain the connector in latched position. At high speeds the blade can be lifted off the windshield by the car created windstream. Thus, without positive retention the blade can be displaced from the arm. It is also desirable that the connector be such that it can be side mounted relative to the blade since many modern vehicles with concealed wiper arms and blades require the side mounted arrangement. U.S. Pat. No. 3,054,128 is not capable of side mounting and can be inadvertently displaced from the arm if the blade is lifted off the windshield. In U.S. Pat. No. 2,694,827 there is no restraint against longitudinal movement if the projection should be displaced from the hole. An advantage lacking in the above mentioned British Patent as well as U.S. Pat. No. 3,054,128 is interchangeability for either right or left hand blade and arm assemblies. Another desirable feature in the connector construction is the capability of being manufactured for use as an adaptor since many blades currently on the market are mounted to the arm differently, particularly those using a cantilever pin type connector. A design capable of being manufactured in the form of an adaptor provides versatility of the blade as well as the connector.

SUMMARY OF THE INVENTION

The connector of the present invention incorporates all of the desirable features mentioned hereinabove. It comprises a pair of spaced apart, parallel side walls secured together. A cylindrical pin extends between the side walls which forms a pivotal axis for the blade relative to the arm. The blade is restrained from longitudinal movement relative to the arm by a bridge extending between the side walls and spaced from the cylindrical surface a distance substantially equal to the thickness of the arm end portion. A releasable detent provides positive engagement and prevents displacement of the blade from the arm without the application of external forces.

In the present invention dual protection against inadvertent displacement of the blade is achieved by use of a detent as well as the restraining effect achieved by disposition of the bent end portion of the arm between two opposed surfaces.

In certain embodiments of the present invention the cylindrical surface in the form of a pin is extended outwardly in cantilever fashion to provide for side mounting. The pin extension can be grooved to serve as an adaptor in a cantilever pin type arm to blade connector. The connector of this invention includes the additional advantage of being interchangeably useable for right or left hand wiper blade and arm assemblies.

The principal object of the present invention is to provide a simple, economical, unitized wiper blade to arm connector which provides for positive retention of the blade on the arm.

Another object of the invention is to provide a simple, economical unitized wiper blade to arm connector which provides for positive retention of the blade to the arm and which may be side mounted.

A further and more specific object of the invention is to provide a simple, economical, unitized wiper blade to arm connector which provides for positive retention of the blade on the arm and which may be releasably side mounted to serve as an adapter to receive downwardly or reversely bent type arm ends on blades designed for other connections.

A still further object of the invention is to provide a wiper blade assembly for wiper arms having a downwardly or reversely bent blade receiving end portion which provides for positive retention and which is universally adaptable to blade assemblies of various constructions.

Other objects and advantages of the invention will be apparent from the following detailed description of the invention taken in connection with the accompany drawings.

BRIEF DESCRIPTION OF THE DRAWINGS

FIG. 1 is a perspective view of a windshield wiper with a connector embodying the invention;

FIG. 2 is a plan of the central part of the wiper of FIG. 1, without the arm;

FIG. 3 is a side elevation of the connector of FIG. 1 with the arm in position;

FIG. 4 is a plan, similar to FIG. 2, of a second construction;

DESCRIPTION OF THE PREFERRED EMBODIMENTS

Figure 5:
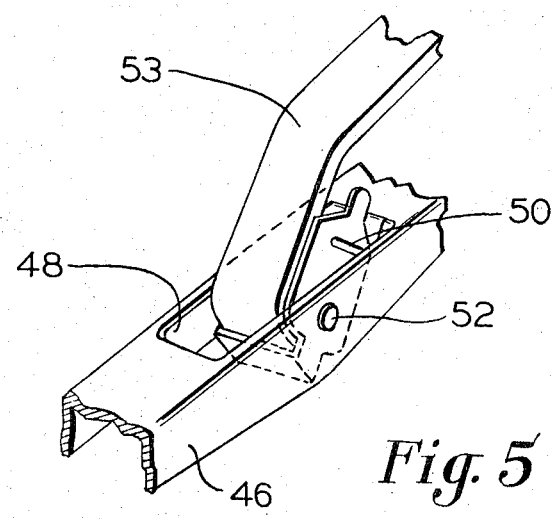
FIG. 5 is a perspective view of a third construction.

The windshield wiper shown in FIG. 1 includes a blade 2, a backing strip 4, and a superstructure made up of two levers 6 and 8, and a yoke 10, the levers 6 and 8 and the yoke 10 being pivoted together by part of a pin 14. A coil spring 12 surrounds the pin, and has ends 13, 15 exerting downward forces on the levers 6 and 8. These components together constitute a known form of windshield wiper blade assembly. This assembly is part of a unit which further includes a connector 16 which is pivoted to the superstructure by means of prolongation of pin 14. This entire unit is intended to be attached to the outer end of an arm 18. At the inner end of this arm there is a mounting head 19 having a socket, indicated in broken lines 20, which in use is fitted onto a driving burr on a driving shaft (not shown). The mounting head 19 is pivoted to retainer 21 about a pin 23 forming a transverse axis. A tension spring 25 acting between the mounting head 19 and the retainer 21 biases the arm toward the windshield to be wiped.

The outer portion or arm extension 22 of the wiper arm 18 has the shape of a bar including upper and lower planar surfaces 22a and 22b. An end portion is formed as a bend 24 of 180°, bent away from the planar surface 22a, with a short straight extremity 26. The direction of the bend may be such that, when the arm is in use in association with a driving shaft and a windshield, the short straight extremity 26 lies nearer the windshield than does the rest of the bar. However in accordance with the broader aspects of the invention, the extremity 26 may be bent away in the opposite direction.

When the unit is in the position of use on the arm, the connector and the bar are in the relative position shown in FIG. 3.

The connector is of resilient sheet metal, and consists of two spaced apart parallel side walls 28, linked together at one end by a bridge 30, the inner surface of which engages the outside of the bend 24 of arm extension 22 as shown in FIG. 3. Between the side walls there is a cylindrical sleeve 32, and the prolongation of the pin 14 passes through the side walls 28 and the sleeve 32, being riveted over, so that the side walls 28 and the sleeve 32 are clamped between the riveted end 34 and a collar 36 integral with the pin 14.

The radial distance between the sleeve 32 and the bridge 30 is substantially equal to the thickness of the arm extension 22. The internal width between the side walls 28 is substantially equal to the width of the arm extension 22. Thus, the arm fits without any significant looseness within the connector 16.

Each of the side walls 28 has an inward projection 38, which lies further than the sleeve 32 from the bridge 30. These inward projections fit between the arm extension 22 and its straight extremity 26, so as to engage the lower planar surface 22b of the arm extension 22 and the upper surface of the straight extremity 26. Thus the inward projections 38 constitute releasable detents for retaining the parts in the position shown in FIG. 3.

In this position, the outer surface of the sleeve 32 constitutes a "first surface" which engages the inside of the bend 24 of the arm. The inner surface of the bridge constitutes a "second surface" for engaging the outside of the bend.

The arm can be released from the unit by exerting upward force on the right hand part of the connector 16, so that the inward projections 38 ride up the sides of the arm extension 22 and disengage therefrom. To enable this to occur, the metal of the side walls 28 must be resilient, so that the side walls can flex somewhat apart from each other. The connector 16 must be swung relatively to the arm, as indicated by the arrow 40 in FIG. 3, through a right angle about the axis of the pin 14, to the position shown in broken lines in 16'. With the connector 16 in the position 16', the bridge 30 no longer prevents movement of the arm to the left relatively to the sleeve 32. Accordingly, the arm can be shifted relatively to the sleeve, and thus relatively to the connector 16, to the position indicated in broken lines at 22', whereupon it can be raised to the position shown at 22", and then withdrawn to the right.

The forces transmitted between the arm and the blade during use have no tendency to release the connector 16 from the arm.

Initial assembly of the arm with the blade is carried out by movements which are the reverse of those described above.

In order to release the latching action of the inward projections 38, it may be necessary to use a tool, and, to facilitate this, the right hand ends of the side walls 28 have prolongations of reduced width as indicated at 42. Then, as shown in FIG. 3, the blade of a screwdriver may be inserted as indicated at 44, and twisted clockwise as indicated by the arrow 45 so as to start relative rotation between the connector and the arm in the direction of the arrow 40.

In the arrangement shown in FIGS. 1 to 3, the connector 16 lies alongside the superstructure, so that the relationship between the arm and the superstructure is that known as "side mounting." The same unit can be applied to either side of the arm, it being merely necessary to reverse the unit end to end, and to move the connector 16 through 180° around the pin 14.

In FIGS. 1 to 3, the connector is permanently attached to the wiper superstructure. FIG. 4 shows how the invention may be employed in conjunction with a superstructure which has a receptor for removably receiving a pin on a connector, for example in the manners described in U.S. Pat. No. 3,378,874 issued Apr. 23, 1968 by Anthony C. Scinta.

In FIG. 4, the parts between the riveted end 34 and the collar 36 are the same as in FIG. 2, but the pin 14a has a tapered tip 15a and a circumferential groove 17a. The levers 6 and 8 and yoke 10 are pivoted together on a tube 19a, the ends of which are riveted outwards. In the lower part of the tube 19a is a window 21a through which the lower parts of the turns of the spring 12 can enter and encroach on the interior of the tube. The pin 14a can be pushed into the tube 19a, whereupon the spring cooperates with the groove 17a to resist withdrawal of the pin.

As another embodiment, the present invention may be applied to arrangements in which the superstructure lies centrally beneath the arm, as illustrated by FIG. 5, which shows the central part of a superstructure which includes a central yoke 46, of channel section, having a central window 48 in its web, to accomodate a connector 50, pivoted on a transverse pin 52.

To enable the connector to be in an accessible position, the arm may be formed with a bend at 53, so that the entire end portion of the arm is inclined towards the windshield.

In FIGS. 1 to 3 and 4 the cylindrical member of the connector is a sleeve. This is a matter of manufacturing convenience. It could also be part of the rod 14. Although the member is preferably a true cylinder, this is not essential, as the necessary prevention of relative movement of the arm and connector could be achieved by, for example, a member of octagonal cross section.

Figure 6:
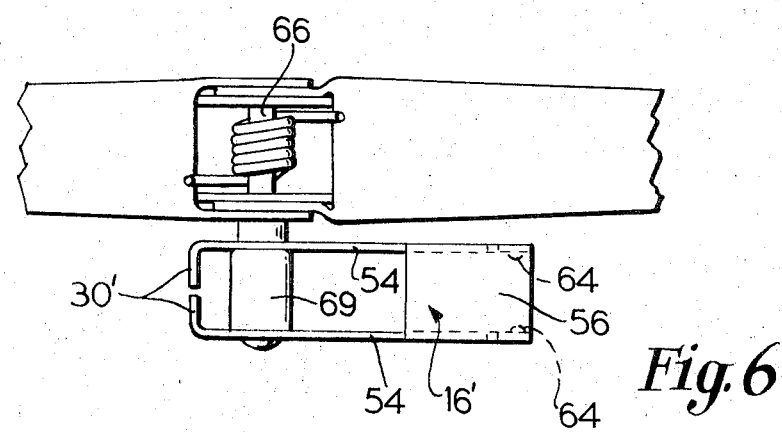
FIG. 6 is a view similar to FIG. 2 of a fourth construction.
Figure 7:
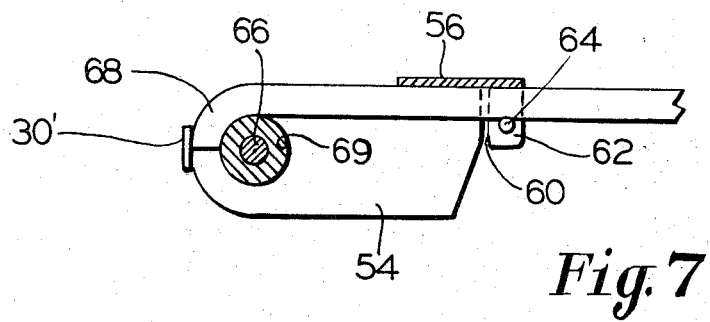
FIG. 7 is a section on the line VII-VII of FIG. 6, with the arm in position, only the parts adjacent to the plane of section being shown.

In the arrangement shown in FIGS. 6 and 7, the side walls 54 of the connector 16' are connected together by a web 56. In place of the bridge 30 in FIGS. 1 to 3, there are two tongues 30' directed towards each other. There is a vertical slit 60 in each side wall 54 near its right hand end, so as to define a tongue 62 on which is an inward pip 64. The two pips are placed so that they engage beneath the edges of the lower face of the bar 22, and constitute releasable detents. These detents, together with the web 56, constitute means which arrest relative angular movement of the arm and the connector about the axis of the pin 66 in the coupled position as shown in FIGS. 6 and 7.

The connector 16' as shown in FIGS. 6 and 7 may be used in conjunction with an arm which has an end portion formed as a bend 68 of 90°, with no straight extremity. In order to release the connector 16' from the bar, it is sufficient to exert upward force on the right hand part of the connector 16', so as to swing the member through a movement of about 30°, and then raise the arm at its outer end sufficiently for the outer end to clear the sleeve 69, whereupon the arm can be withdrawn bodily to the right from the position shown in FIG. 7, until it is completely clear of the connector.

As illustrated in FIG. 7, the arm has an end formed with a bend of 90°. It should be understood that an arm with an end portion of 180° with a short straight extremity as shown in FIGS. 1 and 3 can also be employed with this embodiment. When such an arm is used the arm can be released from the unit by exerting upward force on the right hand part of the connector, so that the pips 64 ride up the sides of the bar and disengage from the bar. The connector should be swung through a total movement of about 90° about the axis of the pin 66 from the position shown in FIG. 7. Then the arm should perform the same movements as already described with reference to FIG. 3.

Referring again to the arrangement shown in FIG. 5, the connector 50 may be replaced by the connector shown in FIGS. 6 and 7 when the superstructure is to be connected to an arm of the kind having a 90° bend at its extremity.

For convenience in illustration separation of the arm from the unit has been described in terms of moving the arm. Of course the movement merely requires to be relative to the wiper blade assembly, and in practice the arm remains attached to the driving shaft, and therefore the actual longitudinal movement for final disengagement is imparted to the wiper blade assembly.

In all the examples, the proportions of the connector, the sleeve, and the bar are so chosen that, in the coupled condition, the various engaging surfaces, including the detents, restrain all relative movement of the arm and connector. Consequently, relative movement of the arm and the unit is confined to rotation about the axis of the pin by which the connector is pivoted to the superstructure.

In the examples, the pin does not rotate relatively to the connector. Members of the superstructure can rotate relatively to the pin. However, it would be equally possible to secure the parts together in such a way that the connector can rotate relatively to the pin, with or without preventing rotation between the pin and one other component.

In the examples shown, the bar is of rectangular cross section. This is not essential. Frequently the outer portions of wiper arms are made of bar having a flat top and bottom and arcuate sides, and this, and other departures from rectangular section are possible, provided the proportions of the connector are chosen to make an adequately close fit around the bar.

A unique wiper arm to blade connector has been shown and described which does not depend for security on the action of a spring urging the wiper arm towards the windshield. A connector according to this invention positively latches the wiper blade to the arm until an operator consciously manipulates the connector to unlatch it. Even if the blade is moved away from the windshield, during cleaning, or by wind at high speed the latching is unaffected.

Connectors according to the invention have the further advantages that they are simple to make, and those shown in FIGS. 1 to 5 do not require to be in two different versions for left-hand and right-hand use.

Certain specific embodiments of the invention have been shown and described for the purpose of illustration but it will be apparent that various modifications and other embodiments are possible within the scope of the invention for example, with an arm having a 90° bend, the part which engages the inside of the bend may be joined to the blade assembly by a bracket instead of by a pin, although there must still be means for pivoting the connector. The connector may be pivoted on a pin carried by a bushing. This bushing may be part of an integral plastic molding including a bracket and a base. The base may be attached to part of a superstructure of a blade assembly, or may be integral with a part of the superstructure.

The invention as illustrated in FIG. 1 may be used in conjunction with a variety of different types of superstructures having a central pivot between members of the superstructure while FIG. 5 is an example of use of the invention with superstructures which do not have a central pivot between members.

It is understood therefore that the invention is not limited to the specific arrangements shown but in its broadest aspects it includes all equivalent embodiments and modifications which come within the scope of the invention.

What is claimed is:

1. A connector for coupling a windshield wiper superstructure to a wiper arm, the wiper arm having an arm extension with a planar surface comprising an end portion, a section of said end portion being bent away from the planar surface, the connector comprising a pair of side walls secured together in parallel spaced apart relationship, means for attaching the connector to the superstructure for pivotal movement relative to the superstructure about an axis transverse to the superstructure, a first surface extending between said pair of side walls positioned to engage one side of said bent section of said end portion, a second surface extending between said pair of side walls positioned to engage the other side of said bent section of said end portion and releasable detent means engagable with said planar portion when the arm is in coupled position whereby relative movement between said arm and said connector is restrained and movement of the blade and connector is limited to angular movement about said axis transverse to the superstructure in coupled position.

2. A connector according to claim 1, in which the first surface is substantially cylindrical.

3. A connector according to claim 2, in which the means for pivoting the connector to the superstructure is a pin extending laterally from the connector, perpendicular to the outer face of one of the side walls.

4. A connector according to claim 1, in which the releasable detent is an inward projection on one of the side walls.

5. A connector according to claim 1 including a third surface capable of engaging a planar surface of the arm which is a continuation of the outside of the bend.

6. A connector according to claim 5, in combination with a wiper arm which has an end portion formed with a bend of 90°.

7. A connector for coupling a windshield wiper superstructure to a wiper arm which has an end portion formed as a bend of 180° with a short straight extremity, the connector comprising two parallel side walls linked together at one end by a bridge, and a substantially cylindrical member lying between the side walls with its axis perpendicular to the side walls, and defining a gap between the bridge and the cylindrical member, at least one of the side walls having an inward projection which lies further than the cylindrical member from the bridge.

8. A connector according to claim 7, in which at least one of the side walls has a prolongation of reduced width, at the end of the side wall remote from the bridge.

9. A connector according to claim 8, in combination with a windshield wiper superstructure and with a wiper arm which has an end portion formed as a bend of 180° with a short straight extremity, means for pivoting the connector to the superstructure about the axis of the cylindrical member, the proportions of the connector and the arm being such that the arm can fit closely between the side walls, the bend of the arm can fit closely between the cylindrical member and the bridge, and the inward projection on the side wall can fit closely between the straight extremity of the arm and a part of the arm opposed to the extremity, so that, in the coupled condition, all relative movement of the arm and the connector is restrained.

* * * * *